US012724596B2

(12) United States Patent
Rosenbeck et al.

(10) Patent No.: US 12,724,596 B2
(45) Date of Patent: Sep. 1, 2026

(54) EXCLUDING FIRMWARE UPGRADE TRAFFIC FROM CUSTOMER PROVISIONED BANDWIDTH

(71) Applicant: CHARTER COMMUNICATIONS OPERATING, LLC, St. Louis, MO (US)

(72) Inventors: Leonard Rosenbeck, Parker, CO (US); Ajay Sriram, Lone Tree, CO (US); Joshua Nelson, Aurora, CO (US); Dustin Phillips, Denver, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 123 days.

(21) Appl. No.: 18/134,725

(22) Filed: Apr. 14, 2023

(65) Prior Publication Data

US 2024/0345821 A1 Oct. 17, 2024

(51) Int. Cl.

*G06F 8/65* (2018.01)
*H04L 47/80* (2022.01)
*H04L 65/80* (2022.01)

(52) U.S. Cl.

CPC .............. *G06F 8/65* (2013.01); *H04L 47/805* (2013.01); *H04L 65/80* (2013.01)

(58) Field of Classification Search

CPC .......... G06F 8/65; H04L 47/805; H04L 65/80
See application file for complete search history.

(56) References Cited

U.S. PATENT DOCUMENTS

| | | | | |
|---|---|---|---|---|
| 7,376,870 | B2 | 5/2008 | Kataria et al. | |
| 9,198,075 | B2 * | 11/2015 | Raleigh | H04L 12/1492 |
| 9,525,595 | B2 | 12/2016 | Chaudhari et al. | |
| 10,609,530 | B1 * | 3/2020 | Patil | G06F 8/65 |
| 10,708,135 | B1 * | 7/2020 | Elliott, IV | H04L 67/1097 |
| 10,931,741 | B1 * | 2/2021 | Liguori | G06F 8/63 |
| 11,183,282 | B2 | 11/2021 | Ansari et al. | |
| 11,204,758 | B1 * | 12/2021 | Vattikuti | G06F 11/3006 |
| 11,418,518 | B2 | 8/2022 | Bryan et al. | |
| 11,671,428 | B2 * | 6/2023 | Su | G06F 8/65 726/2 |
| 12,379,912 | B2 * | 8/2025 | Panikkar | G06F 8/62 |
| 2005/0089064 | A1 * | 4/2005 | Zimmerman | H04Q 11/0478 370/468 |
| 2008/0117991 | A1 * | 5/2008 | Peddireddy | G06F 9/44557 375/241 |
| 2010/0191576 | A1 * | 7/2010 | Raleigh | H04W 12/08 455/406 |

(Continued)

OTHER PUBLICATIONS

Galbraith, R., et al. "Do we need quality of service in the customer environment?." BT technology journal 23.2 (2005): 146-159. (Year: 2005).*

*Primary Examiner* — Matthew J Brophy
(74) *Attorney, Agent, or Firm* — Patent Beach PC

(57) ABSTRACT

Various embodiments comprise systems, methods, architectures, mechanisms and apparatus for configuring CPE provisioning to provide a dynamic service flow so as to temporarily enable augmented bandwidth capabilities and Quality of Service (QoS) sufficient to support firmware updates and the like to the CPE (or CPE-supported equipment), and to do so without utilizing customer bandwidth or disrupting customer service or Quality of Experience (QoE).

19 Claims, 2 Drawing Sheets

(56) References Cited

U.S. PATENT DOCUMENTS

2011/0314086 A1* 12/2011 Finkelstein ............. H04L 65/80
709/203
2013/0308453 A1* 11/2013 Cook ...................... H04L 41/32
370/235
2014/0075427 A1* 3/2014 Pallamreddy ............. G06F 8/65
717/172
2015/0215215 A1* 7/2015 Raleigh ................. H04M 15/43
370/230
2016/0132214 A1* 5/2016 Koushik ................... G06F 8/61
715/741
2019/0386923 A1* 12/2019 Ingerman ................ H04L 47/24
2020/0210165 A1* 7/2020 Pisal ..................... H04L 47/245
2020/0314615 A1* 10/2020 Patil ........................ H04L 67/61
2021/0224061 A1 7/2021 Pillilli et al.
2021/0334082 A1* 10/2021 Su ............................ G06F 8/65
2021/0400043 A1* 12/2021 Su ....................... H04L 63/0807
2023/0393829 A1* 12/2023 Panikkar ............. G06F 11/3006
2024/0086160 A1* 3/2024 Kanso ....................... G06F 8/65
2024/0345821 A1* 10/2024 Rosenbeck ............... G06F 8/65

* cited by examiner

EXCLUDING FIRMWARE UPGRADE TRAFFIC FROM CUSTOMER PROVISIONED BANDWIDTH

FIELD OF THE DISCLOSURE

The present disclosure generally relates to the managing remote equipment such as customer premises equipment (CPE) within a network and, more particularly, to adapting network services associated with the managing of remote equipment.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Customer premises equipment (CPE) is provided to the homes/businesses of services customers or subscribers of a services provider (e.g., a cable company, multiple system operator (MSO), telecommunications provider, and the like). The provided CPE, which is configured to deliver to those subscribers the various service offerings of the services provider, is often maintained by the services provider such as via delivering bug fixes and the like via firmware updates to the CPE. Some classes of CPE, such as cable modems (CMs), routers, voice adapters, and the like, are managed via the customer's high speed data (HSD) connection.

As such, firmware updates and the like may be downloaded to customer CPE via the customer's paid internet access, which is an undesirable use of the customer's bandwidth. Further, if the customer's paid internet access has insufficient bandwidth or Quality of Service (QoS), then a successful firmware download may not be supported.

SUMMARY

Various deficiencies in the prior art are addressed by systems, methods, and apparatus for configuring CPE provisioning to provide a dynamic service flow so as to temporarily enable augmented bandwidth capabilities and Quality of Service (QOS) sufficient to support firmware updates and the like to the CPE (or CPE-supported equipment), and to do so without utilizing customer bandwidth or disrupting customer service or Quality of Experience (QoE).

A method of upgrading a remote device according to an embodiment comprises: responsive to an upgrade notification associated with a remote device, determining whether a quality of service (QOS) of a provisioned service associated with the remote device is sufficient to support the upgrade; responsive to the remote device provisioned service QoS being insufficient to support the upgrade, determining whether the remote device is associated with a bandwidth augmentation qualification; responsive to the remote device being associated with a bandwidth augmentation qualification, creating a dynamic service flow associated with the remote device and sufficient to support the upgrade; and responsive to an upgrade completed notification, terminating the dynamic service flow associated with the remote device.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention provided herein, and the detailed description of the embodiments given below, serve to explain the principles of the present invention.

Figure 1:
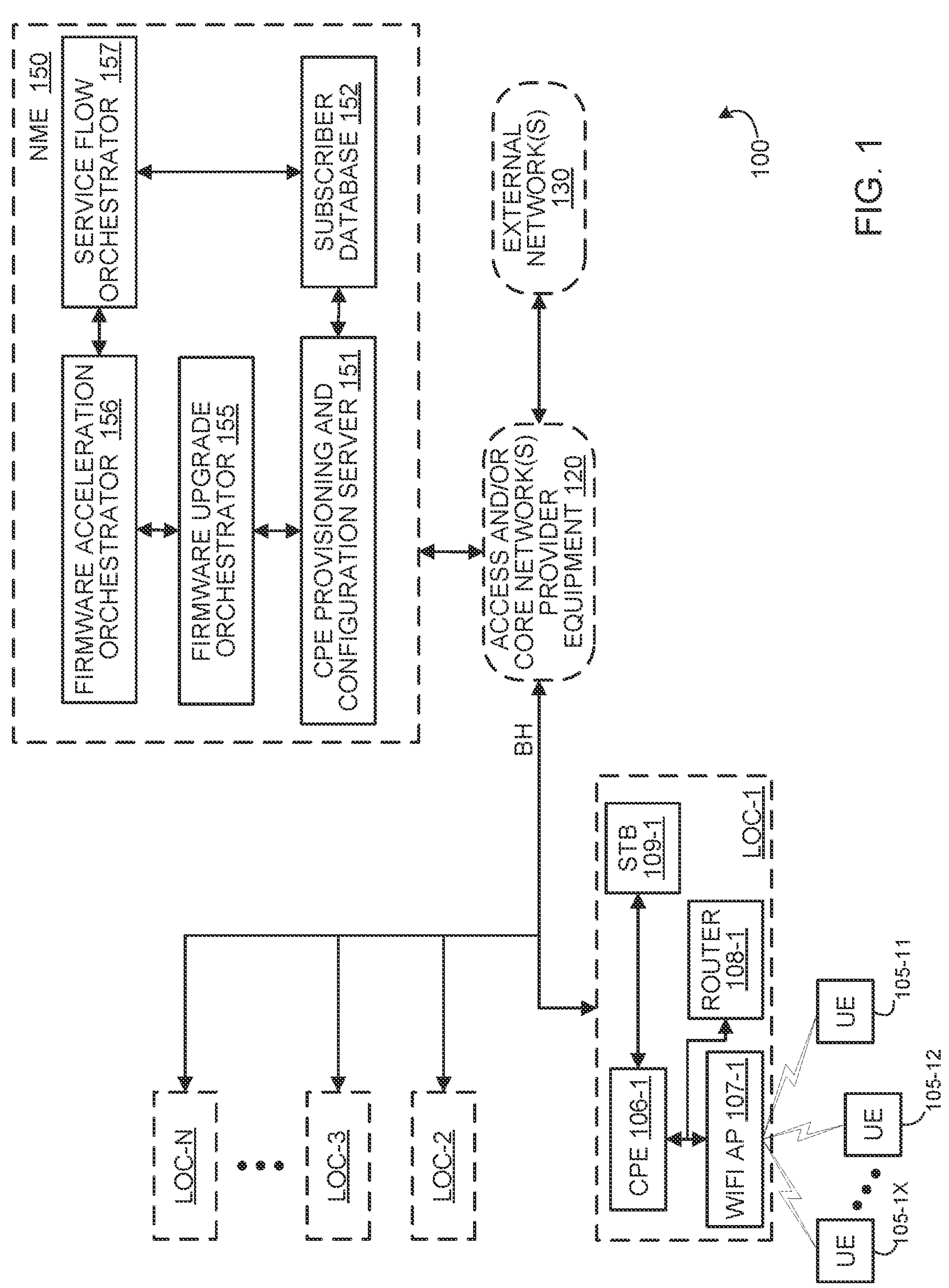
FIG. 1 depicts a block diagram of a network services architecture suitable for use in illustrating the various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment.

DETAILED DESCRIPTION

The following description and drawings merely illustrates the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

A customer premises equipment (CPE) firmware upgrade (or update) may fail for various reasons, including the CPE being bandwidth constrained as belonging to a non-paying subscriber or customer (i.e., a quarantined account), the CPE being associated with low-speed data links and/or data links exhibiting too many timeouts, the firmware upgrade comprising a firmware image to be written directly into relevant CPE memory where the image is too big and the process times out, and so on.

Various deficiencies in the prior art are addressed by systems, methods, and apparatus for configuring CPE provisioning to provide bandwidth and Quality of Service (QOS) sufficient to support firmware updates and the like to the CPE (or CPE-supported equipment), and to do so without utilizing customer bandwidth.

Specifically, various embodiments dynamically create, for a CPE firmware update or related download, a new service flow dedicated to the firmware upgrade process so that the firmware upgrade may be completed more quickly and with a greater success rate while also removing any potential for reduced customer experience during the download. This service flow is removed after the corresponding firmware upgrade request has been processed by the device or there is a timeout.

FIG. 1 depicts a high-level block diagram of a network services architecture benefiting from various embodiments. It will be noted that network services architectures of other types, configurations, technologies and so on may also benefit from the various embodiments. As such, it should not be construed that the embodiments are only appropriate for use in the context of a network services architecture of the type depicted herein with respect to FIG. 1. Generally speaking, the network services architecture may be any architecture suitable for enabling a network operator to provide network services to subscribers and the like such as via customer premises equipment (CPE) as discussed herein.

Specifically, FIG. 1 depicts a plurality of customer or subscriber locations (denoted as LOC-1 through LOC-N) in communication with various provider equipment (PE) associated with access and/or core networks 120, such via a wireless, wired, fiberoptic, or other type of backhaul network BH. The backhaul network may comprise macrocells, small cells, microcells and the like such as eNodeBs (eNBs), cellular network base stations, repeaters, and similar types of provider equipment or logical radio nodes (e.g., gNBs) derived therefrom.

Each of the locations LOC comprises at least a respective customer premises equipment (CPE) 106 such as a modem configured to facilitate communication with the access network via the BH. The CPE 106 may include additional functionality, or may support such additional functionality within the location LOC. The CPE 106 may be updated via firmware updates transmitted to the CPE 106 from firmware management and provisioning entities or functions at a network manager.

For example, a first customer or subscriber location LOC-1 is depicted as including CPE 106-1 (e.g., a modem) configured to support a wireless access point (WAP) 107-1, a router 108-1, and a set top box (STB) 109-1. The WAP 107-1 is depicted as communicating with a plurality of wireless devices, namely, UE 105-11 through 105-1X (e.g., in accordance with the various 802.11xx WiFi standards. In various embodiments, a network services provider utilizes numerous such WAP2 107 distributed over a "coverage footprint" having many locations LOC to provide network services to mobile devices such as the UE 105 discussed herein. The STB 109-1 may be a standard cable television STB configured to deliver broadcast, video on-demand (VOD), and/or other media related services. Further, the STB 109-1 may include a local digital video recorder (DVR) configured to periodically core programming from various channels accessible to the STB 109 such as in accordance with the service level agreement (SLA) of the subscriber associated with the location LOC-1.

The access/core networks 120 may be part of a fixed wireline access network (FWAN) operated by a network operator, wherein subscribers associated with CPE 106 and/or UE 105 receive network services in accordance with a contract with the network operator. The access network 120 may comprise any type of access network, such as a wireless or wireline network configured to support network services and other traffic between CPE 106 and core/external networks 120. The access and/or core networks 120 are depicted as communicating with external networks 130 such as the Internet, an IP Multimedia Subsystem (IMS), or any other type of external network UE 105 receives network services (e.g., voice, streaming media, data upload/download etc.) via the WAPs 107, such as illustratively provided by a remote server (not shown) coupled to the external networks 130 and communicating therethrough with the access and/or core networks 120 and BH networks. The UE 105 may comprise any type of endpoint device, such as a mobile handset, laptop, tablet, and the like.

As depicted in FIG. 1, the various backhaul (BH), access and core networks 120 handle user data or data plane (DP) functions, such as transporting internet protocol (IP) data traffic (i.e., incoming and outgoing IP packets) between the User Equipment (UE) 105 and the external networks 130, handling control plane signaling, and performing various functions as is known.

In various embodiments, various network management equipment (NME) 150 cooperates with the access and/or core networks 120, as well as the BH networks, to perform various network management functions, such as configuration, monitoring, usage reporting, network optimization, congestion monitoring, and so on as is known.

The CPE provisioning and configuration server 151 may be configured to perform various provisioning and configuration functions with respect to the CPE 106 at the various locations LOC, including adapting the operational configurations of CPE 106 (or related devices at a location LOC) such as via firmware upgrades or updates.

It is noted that the NME 150 functional elements may comprise separate entities or servers as generally described herein, or may be implemented in the same entity or server. The relevant operation of the NME 150 and/or other provider equipment will be discussed in more detail below with respect to FIG. 2.

Generally speaking, the NME 150 manages various operational aspects of the CPE 106 and services accessed therethrough at the customer locations LOC in accordance with the network operator's policies, the customer/subscriber/user profiles (e.g., such as defined in service agreements) and the like. For example, each customer may be associated with a corresponding subscriber/user profile having defined therein guaranteed minimum levels of service, such as a minimum download (DL) throughput, minimum upload (UL) throughput, and/or other minimum QoS levels.

It is noted that the NME 150, access and/or core networks 120, BH networks and/or other provider equipment (PE) support the various functions described herein with respect to the embodiments; namely, configuring CPE provisioning to provide bandwidth and Quality of Service (QOS) sufficient to support firmware updates and the like to the CPE (or CPE-supported equipment), and to do so without utilizing customer bandwidth.

As depicted in FIG. 1, the NME 150 includes various elements configured to perform various control and processing operations in accordance with the embodiments, such as a CPE provisioning and configuration server 151, a subscriber database 152, a firmware upgrade orchestrator 155, a firmware acceleration orchestrator 156, and a service flow orchestrator 157.

In various embodiments such as described below with respect to FIG. 2, the firmware upgrade orchestrator 155, firmware acceleration orchestrator 156, and service flow orchestrator 157 may comprise microservices that are invoked in response to a CPE (or other device) firmware upgrade request or similar request. It is noted that the functions depicted herein as microservices may be performed in any other manner suitable for use within the context of a network manager.

The various embodiments discussed herein advantageously accelerate the provisioning of new installations of unprovisioned devices so as to reduce the time required for installation. Firmware upgrades for low bandwidth subscribers (optionally for all subscribers, depending on the desired business/logic rules) will not utilize subscriber bandwidth, so any noticeable reduction in customer experience in advance of the post upgrade reboot will be alleviated.

Augmented bandwidth is added and removed without customer service or quality of experience (QoE) disruption. Currently, when augmented bandwidth is required, the process of augmenting bandwidth necessitates customer interruption. It requires changing the customer provisioned bandwidth followed by a reboot to activate the additional bandwidth and a change of provisioning followed by an additional reboot to remove the augmented bandwidth after the upgrade is completed in addition to the reboot that is part of the upgrade process. As a result, it is used very sparingly and only in dire circumstances.

In some embodiments, augmented bandwidth is exclusive to the firmware download. Current augmentation solutions increase the bandwidth of the subscriber service flow and allow additional speeds to the customer until it is reverted.

In a new install use case, for each newly installed device that is not yet on a customer account, the device may require a firmware update before it is eligible to be placed on a customer account. It is common for devices in the supply chain and warehouse system to be running non-current versions. In this case, the device is unprovisioned and often does not have access to sufficient bandwidth to complete the download of a new firmware image before the upgrade times out. This presents a race condition in which the install cannot proceed until the device is on updated firmware, but simultaneously, the firmware cannot be updated until the device is provisioned and activated on an account to permit additional bandwidth.

In a quarantined accounts use case, quarantined accounts (e.g., seasonal, non-payment or delinquent accounts, DMCA-impacted accounts, accounts associated with abuse of some kind, and so on) typically have restricted bandwidth such as during the off-season, until payment is made, until abuse has stopped, etc. . . . When network devices associated with such quarantined accounts (e.g., in these customer homes) need firmware upgrades, those devices fail the upgrade because they cannot download the image before the upgrade times out.

In a customer having low speed data capability or provisioning, such as legacy 'lite' tiers and older commercial tiers, this low speed data or low speed provisioning may serve to restrict the ability to download a firmware image before the upgrade times out. For example, a firmware update may comprise a large firmware update file, or a number of smaller files (e.g., "chunks" or portions of the large firmware update file). For some CPE, if the large firmware update file cannot be downloaded within a specified period of time a timeout error may be encountered. As such, in some embodiments the size of the firmware update file or other file(s) to be downloaded to the CPE may also be used in determining CPE qualification for augmented bandwidth.

Various elements or portions thereof depicted in FIG. 1 and having functions described herein are implemented at least in part as computing devices having communications capabilities, including for example the UE 105, CPE 106, BH network(s), access and/or core networks 120, NME 150, and various other elements as described herein. These elements or portions thereof have computing devices of various types, though generally a processor element (e.g., a central processing unit (CPU) or other suitable processor(s)), a memory (e.g., random access memory (RAM), read only memory (ROM), and the like), various communications interfaces, input/output interfaces and the like.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus, various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Figure 2:
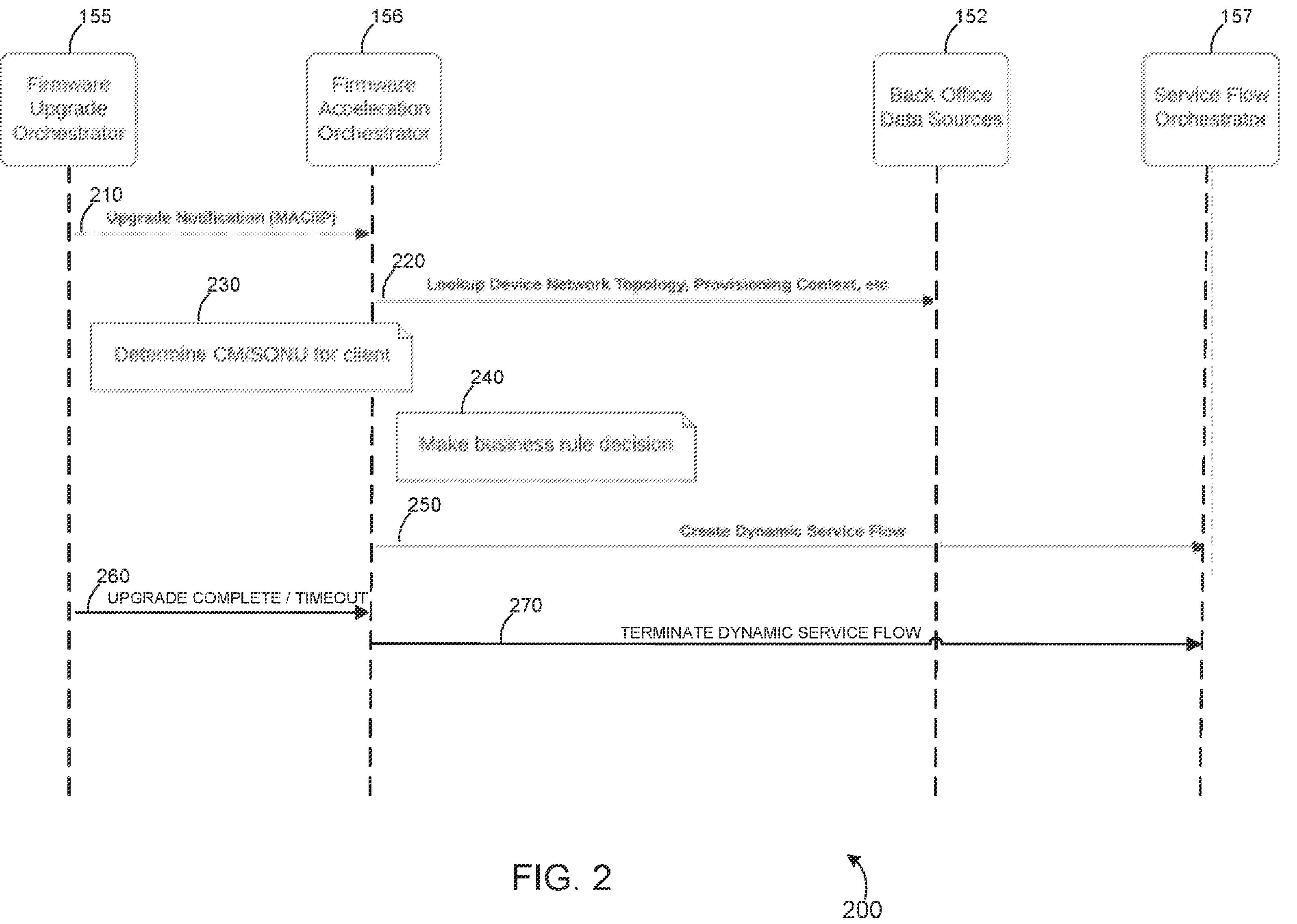
FIG. 2 depicts a flow diagram of a method for upgrading a remote device according to an embodiment.

FIG. 2 depicts a flow diagram of a method for upgrading a remote device according to an embodiment.

At 210, a firmware orchestrator 155 provides an upgrade notification to a firmware acceleration orchestrator 156, which at step 220 responsively retrieves device information (e.g., type, id, capability, etc. of CPE), network topology information, device provisioning context, and other data related to the device to be upgraded, the capabilities of that device (if known), the QoS of the communication channels/links servicing the device, whether the device is newly installed or not, the customer account associated with the device (more particularly, whether the device is associated with a non-paying or quarantined customer account), and other data useful in determining whether the upgrade is currently supported and/or likely to succeed, as well as any data or metadata that is required by business or logic rules governing augmentation of bandwidth for a requested firmware upgrade.

At step 230, the modem associated with the device to be upgraded is determined, or simply the bandwidth and QoS capability of the modem is determined.

At step 240, a business or logical rule based decision is made as to whether a dynamic service flow should be created to augment the bandwidth associated with the remote device so as to further support the upgrade of the remote device.

At step 250, it the device is eligible for bandwidth augmentation per the decision at step 240, then the firmware acceleration orchestrator 156 transmits a "create dynamic service flow" message to the service flow orchestrator 157, which responsively creates a dynamic service flow so as to augment the bandwidth available for the firmware download, and to do so in a manner that does not count towards the bandwidth associated with use of the network by the customer Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method of upgrading a remote device, comprising:

responsive to an upgrade notification associated with the remote device, determining whether a quality of service (QoS) of provisioned service associated with the remote device is sufficient to support an upgrade;

responsive to the QoS being insufficient to support the upgrade, determining whether the remote device is associated with a bandwidth augmentation qualification;

responsive to the determining indicating that the remote device is associated with the bandwidth augmentation qualification, creating a dynamic service flow associated with the remote device and sufficient to support the upgrade, the creating of the dynamic service flow comprising temporarily enabling one or more augmented bandwidth capabilities to support the upgrade without utilizing customer bandwidth; and responsive to an upgrade completed notification, terminating the dynamic service flow associated with the remote device;

wherein the dynamic service flow augments bandwidth available for the upgrade in a manner that obviates a race condition in which the upgrade cannot proceed until the remote device is placed on an account to obtain additional bandwidth, but placement on the account cannot proceed until the remote device is on updated firmware.

2. The method of claim 1, further comprising:

responsive to a failure to receive an upgrade completed notification within a predefined time period, terminating the dynamic service flow associated with the remote device.

3. The method of claim 1, wherein the temporarily enabling of the one or more augmented bandwidth capabilities and the QOS sufficient to support the upgrade without utilizing the customer bandwidth comprises preventing allocation to customer bandwidth usage of any bandwidth used by the dynamic service flow.

4. The method of claim 1, wherein the creating of the dynamic service flow is configured to avoid disruption of customer service.

5. The method of claim 1, wherein the creating of the dynamic service flow has associated with it a QoS level sufficient to support the upgrade.

6. The method of claim 5, wherein the QoS level of the dynamic service flow is sufficient to enable the download of upgrade data within a maximum download time.

7. The method of claim 1, wherein the bandwidth augmentation qualification comprises at least one of the remote device being a newly installed device and a device associated with low speed provisioning.

8. The method of claim 1, wherein the bandwidth augmentation qualification comprises the remote device being associated with a quarantined customer account.

9. The method of claim 1, wherein the remote device comprises customer premises equipment (CPE) at a customer location, or equipment proximate the CPE at the customer location.

10. The method of claim 1, wherein the upgrade comprises a firmware upgrade of the remote device.

11. The method of claim 9, wherein determining whether the provisioned service associated with the remote device is sufficient to support the upgrade comprises determining whether the CPE at the customer location is associated with a quarantined customer account.

12. The method of claim 10, wherein determining whether the provisioned service associated with the remote device is sufficient to support the upgrade comprises determining whether the firmware upgrade may be downloaded to the remote device as a single file.

13. Network management equipment (NME) configured for managing and upgrading customer premises equipment (CPE) within a network and including a CPE provisioning server configured to provision CPE network services, the NME configured for:

responsive to an upgrade notification associated with a CPE, determining whether a quality of service (QoS) of provisioned service associated with the CPE is sufficient to support an upgrade;

responsive to the QoS being insufficient to support the upgrade, determining whether the CPE is associated with a bandwidth augmentation qualification, the bandwidth augmentation qualification comprising the CPE not being associated with a customer account;

responsive to the determining indicating that the CPE is associated with the bandwidth augmentation qualification, creating a dynamic service flow associated with the CPE and sufficient to support the upgrade, wherein the dynamic service flow augments bandwidth available for the upgrade to resolve a race condition in which: (i) the CPE cannot be placed on the customer account until the CPE is on updated firmware, and (ii) the updated firmware cannot be downloaded until the CPE is provisioned and activated on the customer account to permit additional bandwidth;

preventing allocation to customer bandwidth usage of any bandwidth used by the dynamic service flow; and responsive to an upgrade completed notification, terminating the dynamic service flow associated with the CPE.

14. The NME of claim 13, further configured for:

responsive to a failure to receive an upgrade completed notification within a predefined time period, terminating the dynamic service flow associated with the CPE.

15. The NME of claim 13, wherein the dynamic service flow is configured to avoid disruption of customer service.

16. The NME of claim 13, wherein the dynamic service flow has associated with it a quality of service (QoS) level sufficient to support the upgrade.

17. The NME of claim 16, wherein the QoS level of the dynamic service flow is sufficient to enable download of upgrade data within a maximum download time.

18. The NME of claim 13, wherein a firmware orchestrator microservice is configured to initiate CPE upgrades and terminate dynamic service flows associated with the CPE upgrades.

19. A computer implemented method of upgrading a remote device, comprising:

responsive to an upgrade notification associated with the remote device, determining whether a quality of service (QoS) of provisioned service associated with the remote device is sufficient to support an upgrade;

responsive to the QoS being insufficient to support the upgrade, determining whether the remote device is associated with a bandwidth augmentation qualification, the bandwidth augmentation qualification comprising the remote device not yet being on a customer account;

responsive to determining that the remote device is associated with the bandwidth augmentation qualification, creating a dynamic service flow associated with the remote device and sufficient to support the upgrade, wherein the creating of the dynamic service flow comprises augmenting bandwidth available for the upgrade in a manner that does not count towards bandwidth associated with use of a network by the remote device and that resolves a race condition in which (i) the remote device cannot be placed on the customer account until the remote device is on updated firmware, and (ii) the updated firmware cannot be downloaded until the remote device is provisioned and activated on the customer account to permit additional bandwidth; and responsive to an upgrade completed notification, terminating the dynamic service flow associated with the remote device.

* * * * *